US010678628B2

(12) United States Patent
McEwen et al.

(10) Patent No.: US 10,678,628 B2
(45) Date of Patent: *Jun. 9, 2020

(54) AUTOMATED INCIDENT RESOLUTION SYSTEM AND METHOD

(71) Applicant: JPMorgan Chase Bank, N.A., New York, NY (US)

(72) Inventors: Paul McEwen, New York, NY (US); Dean Ridley, Bedfordshire (GB); Nej Adamian, Middlesex (GB); Willie Yeo, Singapore (MY); Paresh Dalvi, London (GB)

(73) Assignee: JPMorgan Chase Bank, N.A., New York, NY (US)

( * ) Notice: Subject to any disclaimer, the term of this patent is extended or adjusted under 35 U.S.C. 154(b) by 143 days.

This patent is subject to a terminal disclaimer.

(21) Appl. No.: 15/366,276

(22) Filed: Dec. 1, 2016

(65) Prior Publication Data

US 2017/0083400 A1  Mar. 23, 2017

Related U.S. Application Data

(63) Continuation of application No. 14/138,571, filed on Dec. 23, 2013, now Pat. No. 9,542,259.

(51) Int. Cl.
*G06F 11/07* (2006.01)
*G06F 11/22* (2006.01)

(52) U.S. Cl.
CPC ...... *G06F 11/0793* (2013.01); *G06F 11/0706* (2013.01); *G06F 11/0709* (2013.01); *G06F 11/079* (2013.01); *G06F 11/0751* (2013.01); *G06F 11/0769* (2013.01); *G06F 11/2257* (2013.01)

(58) Field of Classification Search
CPC ............ G06F 11/0766; G06F 11/0769; G06F 11/079; G06F 11/0793; G06F 11/2257; G06F 11/2263; G06F 11/2294; G06F 9/453; G05B 23/0216; G05B 23/0275
See application file for complete search history.

(56) References Cited

U.S. PATENT DOCUMENTS

| | | | |
|---|---|---|---|
| 4,751,702 A | 6/1988 | Beier et al. | |
| 4,866,635 A * | 9/1989 | Kahn | G06F 11/2257 706/46 |
| 5,027,269 A | 6/1991 | Grant et al. | |
| 5,075,881 A | 12/1991 | Blomberg et al. | |
| 5,313,616 A | 5/1994 | Cline et al. | |
| 5,347,518 A | 9/1994 | Lee | |
| 5,386,551 A | 1/1995 | Chikira et al. | |

(Continued)

FOREIGN PATENT DOCUMENTS

WO    01/74043    10/2001

OTHER PUBLICATIONS

Alessandra Agostini et al, A light workflow management system using simple process models, Computer Supported Cooperative Work, pp. 335-363 (Nov. 2000).

(Continued)

*Primary Examiner* — Gabriel Chu
(74) *Attorney, Agent, or Firm* — Hunton Andrews Kurth LLP

(57) ABSTRACT

Methods, systems and computer program products for automated resolution of computer system incidents are provided.

11 Claims, 3 Drawing Sheets

(56) References Cited

U.S. PATENT DOCUMENTS

| | | | |
|---|---|---|---|
| 5,446,895 A | 8/1995 | White et al. | |
| 5,539,885 A | 7/1996 | Ono et al. | |
| 5,549,117 A | 8/1996 | Tacklind et al. | |
| 5,563,998 A | 10/1996 | Yakish et al. | |
| 5,566,297 A | 10/1996 | Devarakonda | |
| 5,594,863 A | 1/1997 | Stiles | |
| 5,630,047 A | 5/1997 | Wang | |
| 5,630,069 A | 5/1997 | Flores et al. | |
| 5,655,074 A | 8/1997 | Rauscher | |
| 5,666,481 A * | 9/1997 | Lewis | G06F 11/2257 714/15 |
| 5,701,471 A | 12/1997 | Subramanyam | |
| 5,712,971 A | 1/1998 | Stanfill et al. | |
| 5,721,913 A | 2/1998 | Ackroff et al. | |
| 5,721,914 A | 2/1998 | De Vries | |
| 5,748,878 A | 5/1998 | Rees et al. | |
| 5,752,034 A | 5/1998 | Srivastava | |
| 5,758,061 A | 5/1998 | Plum | |
| 5,768,506 A | 6/1998 | Randell | |
| 5,781,448 A | 7/1998 | Nakamura et al. | |
| 5,784,562 A | 7/1998 | Diener | |
| 5,799,297 A | 8/1998 | Goodridge et al. | |
| 5,806,075 A | 9/1998 | Jain et al. | |
| 5,828,883 A | 10/1998 | Hall | |
| 5,835,770 A | 11/1998 | Shum et al. | |
| 5,842,196 A | 11/1998 | Agarwal et al. | |
| 5,845,292 A | 12/1998 | Bohannon et al. | |
| 5,872,976 A | 2/1999 | Yee et al. | |
| 5,884,037 A | 3/1999 | Aras et al. | |
| 5,903,721 A | 5/1999 | Sixtus | |
| 5,903,897 A | 5/1999 | Carrier, III et al. | |
| 5,920,719 A | 7/1999 | Sutton et al. | |
| 5,937,198 A | 8/1999 | Nelson et al. | |
| 5,960,196 A | 9/1999 | Carrier, III et al. | |
| 5,960,445 A | 9/1999 | Tamori et al. | |
| 5,983,364 A * | 11/1999 | Bortcosh | G06F 11/2257 714/25 |
| 5,995,965 A | 11/1999 | Experton | |
| 6,003,075 A | 12/1999 | Arendt et al. | |
| 6,009,274 A | 12/1999 | Fletcher et al. | |
| 6,026,237 A | 2/2000 | Berry et al. | |
| 6,028,938 A | 2/2000 | Malkin et al. | |
| 6,029,002 A | 2/2000 | Afifi et al. | |
| 6,058,393 A | 5/2000 | Meier et al. | |
| 6,061,503 A | 5/2000 | Chamberlain | |
| 6,061,686 A | 5/2000 | Gauvin et al. | |
| 6,067,412 A | 5/2000 | Blake et al. | |
| 6,073,107 A | 6/2000 | Minkiewicz et al. | |
| 6,088,700 A | 7/2000 | Larsen et al. | |
| 6,101,601 A | 8/2000 | Matthews et al. | |
| 6,108,673 A | 8/2000 | Brandt et al. | |
| 6,125,390 A | 9/2000 | Touboul | |
| 6,128,708 A | 10/2000 | Fitzpatrick et al. | |
| 6,138,112 A | 10/2000 | Slutz | |
| 6,145,121 A | 11/2000 | Levy et al. | |
| 6,167,534 A | 12/2000 | Straathof et al. | |
| 6,175,833 B1 | 1/2001 | West et al. | |
| 6,195,676 B1 | 2/2001 | Spix et al. | |
| 6,230,319 B1 | 5/2001 | Britt, Jr. et al. | |
| 6,237,035 B1 | 5/2001 | Himmel et al. | |
| 6,237,143 B1 | 5/2001 | Fontana et al. | |
| 6,243,862 B1 | 6/2001 | Lebow | |
| 6,247,029 B1 | 6/2001 | Kelley et al. | |
| 6,249,877 B1 | 6/2001 | Kawakami et al. | |
| 6,269,479 B1 | 7/2001 | Puram | |
| 6,279,039 B1 | 8/2001 | Bhat et al. | |
| 6,301,701 B1 | 10/2001 | Walker et al. | |
| 6,311,327 B1 | 10/2001 | O'Brien et al. | |
| 6,363,499 B1 | 3/2002 | Delo et al. | |
| 6,363,524 B1 | 3/2002 | Loy | |
| 6,405,250 B1 | 6/2002 | Lin et al. | |
| 6,405,364 B1 | 6/2002 | Bowman-Amuah | |
| 6,411,910 B1 | 6/2002 | Eulau et al. | |
| 6,424,981 B1 | 7/2002 | Isaac et al. | |
| 6,438,749 B1 | 8/2002 | Chamberlain | |
| 6,446,126 B1 | 9/2002 | Huang et al. | |
| 6,463,454 B1 | 10/2002 | Lumelsky et al. | |
| 6,466,980 B1 | 10/2002 | Lumelsky et al. | |
| 6,467,052 B1 | 10/2002 | Kaler et al. | |
| 6,470,464 B2 | 10/2002 | Bertram et al. | |
| 6,477,471 B1 | 11/2002 | Hedstrom et al. | |
| 6,502,207 B1 | 12/2002 | Itoh et al. | |
| 6,505,176 B2 | 1/2003 | DeFrancecso, Jr. et al. | |
| 6,513,154 B1 | 1/2003 | Porterfield | |
| 6,519,763 B1 | 2/2003 | Kaufer et al. | |
| 6,526,443 B1 | 2/2003 | Goldsmith et al. | |
| 6,546,506 B1 | 4/2003 | Lewis | |
| 6,560,580 B1 | 5/2003 | Fraser et al. | |
| 6,578,004 B1 | 6/2003 | Cimral et al. | |
| 6,578,006 B1 | 6/2003 | Saito et al. | |
| 6,584,447 B1 | 6/2003 | Fox et al. | |
| 6,587,841 B1 | 7/2003 | DeFrancecso, Jr. et al. | |
| 6,601,017 B1 | 7/2003 | Kennedy et al. | |
| 6,601,018 B1 | 7/2003 | Logan | |
| 6,601,233 B1 | 7/2003 | Underwood | |
| 6,604,141 B1 * | 8/2003 | Ventura | G06N 5/00 706/16 |
| 6,615,240 B1 * | 9/2003 | Sullivan | G06Q 30/02 709/205 |
| 6,626,953 B2 | 9/2003 | Johndrew et al. | |
| 6,629,266 B1 | 9/2003 | Harper et al. | |
| 6,820,088 B1 | 11/2004 | Hind et al. | |
| 6,826,745 B2 | 11/2004 | Coker et al. | |
| 6,920,467 B1 | 7/2005 | Yoshimoto | |
| 6,934,934 B1 | 8/2005 | Osborne, II et al. | |
| 7,493,325 B1 * | 2/2009 | Bhatnagar | G06F 17/3061 |
| 7,890,318 B2 * | 2/2011 | Castellani | G06F 11/0733 704/257 |
| 9,313,091 B1 * | 4/2016 | Schnegelberger | H04L 41/16 |
| 9,626,432 B2 * | 4/2017 | Acevedo Arizpe | G06F 3/0482 |
| 2002/0004912 A1 | 1/2002 | Fung | |
| 2002/0133593 A1 | 9/2002 | Johnson et al. | |
| 2002/0133757 A1 | 9/2002 | Bertram et al. | |
| 2002/0138571 A1 | 9/2002 | Trinon et al. | |
| 2002/0143929 A1 | 10/2002 | Maltz et al. | |
| 2002/0147961 A1 | 10/2002 | Charters et al. | |
| 2002/0162090 A1 | 10/2002 | Parnell et al. | |
| 2002/0165754 A1 | 11/2002 | Tang et al. | |
| 2002/0169862 A1 * | 11/2002 | Bialk | H04L 41/0631 709/223 |
| 2003/0004848 A1 | 1/2003 | Hellerstein et al. | |
| 2003/0018952 A1 | 1/2003 | Roetzheim | |
| 2003/0033586 A1 | 2/2003 | Lawler | |
| 2003/0041000 A1 | 2/2003 | Zajac et al. | |
| 2003/0065644 A1 | 4/2003 | Horman et al. | |
| 2003/0120539 A1 | 6/2003 | Korium et al. | |
| 2003/0144868 A1 | 7/2003 | MacIntyre et al. | |
| 2003/0188290 A1 | 10/2003 | Corral | |
| 2003/0196190 A1 | 10/2003 | Ruffolo et al. | |
| 2003/0212518 A1 | 11/2003 | De'Alessandro et al. | |
| 2003/0225662 A1 | 12/2003 | Horan et al. | |
| 2003/0225663 A1 | 12/2003 | Horan et al. | |
| 2004/0068497 A1 * | 4/2004 | Rishel | G06F 17/30672 |
| 2004/0083213 A1 * | 4/2004 | Wu | G06Q 10/10 |
| 2004/0139106 A1 * | 7/2004 | Bachman | G06F 17/30864 |
| 2005/0071807 A1 | 3/2005 | Yanai | |
| 2006/0106796 A1 * | 5/2006 | Venkataraman | G05B 23/0216 |
| 2008/0091454 A1 * | 4/2008 | Fisher, Jr. | G06Q 10/103 705/301 |
| 2009/0030856 A1 * | 1/2009 | Arena | G06Q 10/10 706/11 |
| 2010/0077008 A1 * | 3/2010 | Davis | G06F 17/30011 707/797 |
| 2011/0161274 A1 * | 6/2011 | Gao | G06F 17/30525 706/50 |
| 2012/0130968 A1 * | 5/2012 | Mule | G06F 11/0793 707/706 |
| 2013/0013248 A1 * | 1/2013 | Brugler | G06F 11/3082 702/130 |
| 2013/0117267 A1 * | 5/2013 | Buryak | G06F 17/30598 707/737 |
| 2013/0262082 A1 * | 10/2013 | McKeeman | G06F 17/27 704/9 |

(56) References Cited

U.S. PATENT DOCUMENTS

| | | | | |
|---|---|---|---|---|
| 2013/0275392 A1* | 10/2013 | Bhatt | ................ | G06F 17/30657 707/692 |
| 2014/0114613 A1* | 4/2014 | Wang | ................ | G05B 23/0205 702/185 |
| 2014/0310222 A1* | 10/2014 | Davlos | ................ | G06N 5/04 706/46 |
| 2015/0095722 A1* | 4/2015 | Ramachandra | ..... | G06F 11/3604 714/54 |

OTHER PUBLICATIONS

Betwixt: Turning beans into XML, http://web.archive.org/web/20020620000410/http://jakarta.apache.org/commons/betwixt (last visited Nov. 13, 2005).

Claes Wohlin et al, Understanding the Sources of Software Defects: A Filtering Approach (Abstract), 8th Int'l Workshop on Program Comprehension, p. 9 (2000).

CSK Software AG, Business Process Automation and Workflow in the Financial Industry (2003).

D.M. Hilbert et al, An approach to large-scale collection of application usage data over the internet (Abstract), Proc. Int'l Conf. Software Engineering, pp. 136-145 (1998).

David S. Lindsay, Software Evaluation, Tests, and Measurements (Abstract), in ACM Computing Rev. (J.E. Sammet, ed.), p. 519 (1981).

Dimitrious Georgakopoulos et al, An Overview of Workflow Management: From Process Modeling to Workflow Automation Infrastructure, Distributed and Parallel Databases, pp. 119-153 (1995).

Drake E. Lundell Jr. et al, Computer Use—an executive's guide (Abstract), in ACM Computing Rev. (M.A. Duggan, ed.), pp. 48-49 (1974).

Esmond Pitt et al, java.rmi: The Remove Method Invocation Guide, Section 3.5 (2001).

ExoLab Group, Using Castor XML, http://web.archive.org/web/20010827042213/http://www.castor.org/xml_framework.html (last visited Nov. 11, 2005).

Graham Hamilton, ed., Sun Microsystems JavaBeans API Specification, pp. 54-82 (1997).

IBM Corporation, Code Generation for Database Applications, IBM Tech. Disclosure Bulletin Mar. 1992 (Mar. 1992).

IBM Corporation, OS/2 EE Database Manager SQLJRA Remote Protocol, IBM Tech. Disclosure Bulletin Jan. 1993, pp. 33-36 (Apr. 1993).

J.P. Hudepohl et al, Integrating metrics and models for software risk assessment (Abstract), 7th Int'l Conf. Software Reliability Engineering, p. 93 (1996).

Len Reinhart, Liability management: A new tool for financial consultants, Financial Consultant (Fall/Winter 1996).

Mary Campione et al, Java Tutorial: A Short Course on the Basics, Ch. 5 (3d ed. 2000).

Norman E. Fenton et al, A Critique of Software Defect Prediction Models, IEEE Transactions Software Engineering, pp. 675-689 (Sep./Oct. 1999).

S.G. Linkman, Quantitative monitoring of software development by time-based and intercheckpoint monitoring (Abstract), Software Engineering J., pp. 43-49 (Jan. 1990).

Sanjay Mohapatra et al, Defect Prevention through Defect Prediction: A Case Study at Infosys (Abstract), IEEE Int'l Conf. Software Maintenance, p. 260 (2001).

Steve McConnell, Gauging Software Readiness with Defect Tracking, IEEE Software (May/Jun. 1997).

Sybase Inc., Monitor Client Library 12.5 Progammer's Guide (May 2001).

Tze-Jie Yu et al, An Analysis of Several Software Defect Models, IEEE Transactions Software Engineering. pp. 1261-1270 (Sep. 1988).

V. Basili et al, Understanding and predicting the process of software maintenance releases (Abstract), 18th Int'l Conf. Software Engineering, p. 464 (1996).

Ytzhak Levendel, Reliability Anlaysis of Large Software Systems: Defect Data Modeling, IEEE Transactions Software Engineering, pp. 141-152 (Feb. 1990).

* cited by examiner

AUTOMATED INCIDENT RESOLUTION SYSTEM AND METHOD

RELATED APPLICATIONS

This application is a continuation of U.S. application Ser. No. 14/138,571, filed Dec. 23, 2013, the entire contents of which are incorporated herein by reference.

TECHNICAL FIELD

The field generally relates to computer system management and, more specifically, to automated incident resolution of technical issues on end-user computing devices.

BACKGROUND

Manual resolution of incidents corresponding to technical issues on end-user computing devices can be time consuming and costly for any organization. Reported incidents are usually addressed based on available manpower, may require one or more levels of escalation, and often result in delay and lost productivity for end-users. Accordingly, there is an ongoing demand to provide a process by which an increased number of technical issues on end-user computing devices may be resolved, while at the same time reducing the response time and resources needed to do so.

SUMMARY OF THE INVENTION

Methods, systems and computer program products for automated incident resolution of technical issues on end-user computing devices are provided. Embodiments of the present invention are generally directed to automatically diagnosing and resolving technical issues. In an embodiment, a description of a computer-related incident or configuration problem may be received at an automated incident resolution system. The description may be used to automatically identify, diagnose, detect, and resolve one or more existing or potential technical issues on a computing device of the end-user without manual intervention from the end-user or a system support professional.

In one example, an end-user experiencing a problem with a computing device may create a help desk support ticket. The end-user may enter a description of the incident encountered into a free-text field and submit an incident report for resolution. When the description of the incident is received, the text of the description submitted may be parsed to identify meaningful keywords and phrases. The keywords and phrases may be analyzed against a database of knowledge objects (KOs) and key performance indicators (KPIs) to identify one or more matching known technical issues having at least one pre-existing, automated diagnostic and corrective routines that may be used to automatically resolve the incident on the end-user's computing device. When an automated diagnostic and corrective routine cannot be identified for a reported incident, then the reported incident may be queued for manual help-desk support.

A diagnostic script may be generated to perform one or more predefined diagnostic steps on the computing device reported to be experiencing a problem. For example, a diagnostic script may be generated to perform one or more diagnostic checks associated with the computing device. A diagnostic script also may be generated when the reported issue is only partially recognized or is not recognized at all. Further, a diagnostic script may be generated and executed on the computing device to compare the configuration of the computing device against one or more known "good" computing device and/or application software configurations. An entire diagnostic script or one or more portions of a diagnostic script may be predefined.

A corrective script may be generated based on a result of the diagnostic script and applied to the computing device based on a reported incident that matches one or more KOs/KPIs. The corrective script may be comprised of one or more scripts that are run directly on the computing device or applied from a remote location. The corrective script may comprise one or more fixes to be automatically applied to the computing device. For example, the corrective script may include one or more additional fixes identified by the diagnostic script, but were not reported by the end-user. The additional fixes may be applied proactively to resolve issues before such issues become problematic for the end-user of the computing device. When the corrective script has been applied to the computing device, the reported incident or ticket is automatically closed and the end-user may be notified (e.g., immediately or at a subsequent time) that the incident has been resolved.

In another embodiment, a reported incident may be matched to a predefined self-help option that can be performed by the end-user (e.g., how to configure an iPhone® to receive company e-mail). The end-user may be automatically directed to the self-help option, such as a webpage comprising questions or instructions, and the reported incident may then be automatically closed.

Information about an automatically resolved incident may be logged without human intervention and the possibility of human error. The information may be aggregated with other help-desk support information to provide visual indicators of emerging and existing technical issues across an enterprise. For example, geographical heat maps may be generated to reflect real-time incident reporting across various locations. The heat maps may be configured to provide visual feedback of technical issues that are occurring or have occurred in one or more geographic locations over a period of time. An administrative-level system support professional may interact with the heat map to obtain information including, but not limited to, the most frequently used keywords reported for issues relating to a particular resource, service or application (e.g., Bloomberg. Reuters, Outlook, etc.) or at a particular location (e.g., country, state, city, street, building, floor, desk, line of business, etc.).

BRIEF DESCRIPTION OF THE DRAWINGS

The present invention is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Figure 1:
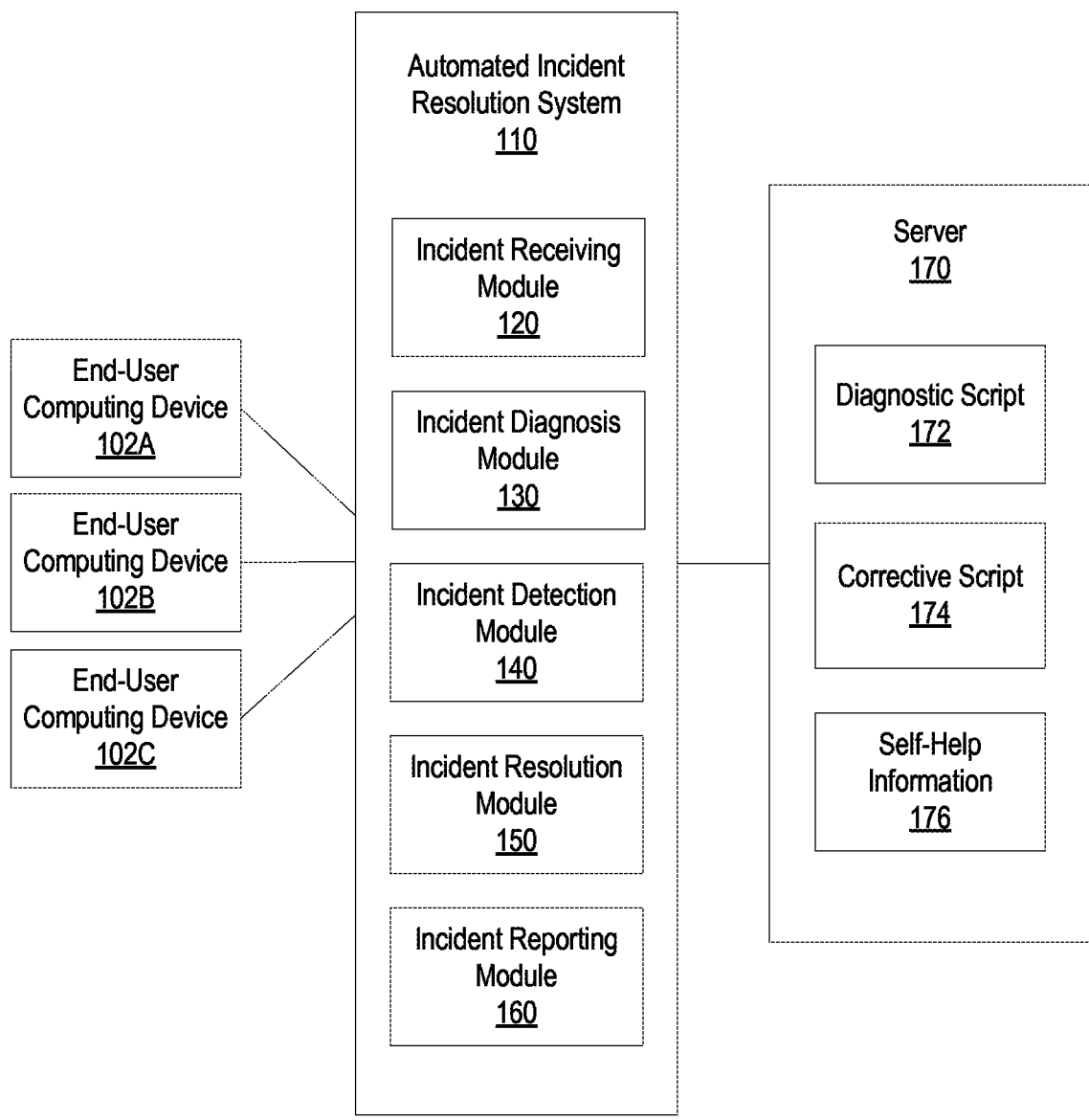
FIG. 1 is a block diagram illustrating a computer network environment for enabling embodiments of the present invention.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "computing", "receiving". "comparing", "determining", "applying", "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description that follows. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

FIG. 1 is a block diagram illustrating a computer network environment 100 for enabling embodiments of the present invention. Computer network environment 100 may be comprised of a plurality of end-user computing devices 102A-102C, an automated incident resolution system 110, and a server 170. Computer network environment 100 may be, for example, a public network (e.g., the Internet), a private network (e.g., a local area network (LAN) or wide area network (WAN)), or a combination thereof. End-user computing devices 102A-102C in computer network environment 100 may include personal computers (PC) laptops, mobile phones, tablet computers, or any other computing device.

Automated incident resolution system 110 may be comprised of an incident receiving module 120, an incident diagnosis module 130, an incident detection module 140, an incident resolution module 150, and an incident reporting module 160. Automated incident resolution system 110 may be provided using one or more physical and/or virtual computing systems.

Incident receiving module 120 may be configured to receive information reported about incidents corresponding to one or more technical issues involving computing devices. In one example, end-users of computing devices 102A-102C may self-report incidents corresponding to one or more technical issues. In another example, computing devices 102A-102C may be computing devices with or without a human operator that are configured to self-report incidents corresponding to one or more technical issues. In yet another example, computing devices 102A-102C may be configured to report incidents corresponding to one or more technical issues on behalf of other computing devices that are communicatively coupled to computing devices 102A-107C.

In an embodiment, incident receiving module 120 receives descriptive information about known technical issues that may be used to automatically match predefined diagnostic, corrective, and self-help options to end-user reported incidents corresponding to technical issues. In one example, the descriptive information may be one or more knowledge objects (KOs) that include definitions, keywords, phrases, and other information associated with one or more known technical issues. In another example, the descriptive information may comprise one or more key performance indicators (KPI), which may include one or more baseline computer performance metrics that may be used for diagnostic purposes.

In one embodiment, incident receiving module 120 receives, stores, and manages one or more defined set of instructions to address a known technical issue. For example, incident receiving module 120 may receive, store, and manage one or more diagnostic scripts 172, corrective scripts 174, or units of self-help information 176 to address a known technical issue. Each diagnostic script 172, corrective script 174, and unit self-help information 176 may be associated with one or more known technical issues, and may be associated with one another (e.g., sequenced, dependent on, etc.) and applied together to address one or more known technical issues.

Incident diagnosis module 130 may be configured to determine whether an incident described in an incident report is related to one or more known technical issues. In an embodiment, incident diagnosis module 130 determines that the incident may be addressed by utilizing one or more diagnostic scripts 172, corrective scripts 174 and/or self-help information 176 units. In one example, incident diagnosis module 130 may parse text that has been received in an incident report. Incident diagnosis module 130 then may detect and match keywords received in an incident report with KOs, KPIs, identified keywords, and descriptions associated with known technical issues.

Incident detection module 140 may be configured to run one or more diagnostic scripts 172 that are related or unrelated to the incident that has been reported. In one example, incident detection module 140 runs one or more diagnostic scripts 172 associated with an identified known technical issue that matches information received in an incident report from computing devices 102A-102C. In another example, a general, global, or specialized diagnostic scripts 172 may be used to identify one or more other technical issues with a computing device that have not been reported.

Incident resolution module 150 may be configured to run one or more corrective scripts 174 that are related or unrelated to the incident that has been reported. In one example, incident resolution model runs one or more corrective scripts 174 associated with an identified known technical issue matching information received in an incident report from computing devices 102A-102C. In another example, other corrective scripts 174 are used to resolve one or more other technical issues that have been detected, which are not related to the user reported incident.

Incident reporting module 160 may be configured to generate and update reporting information related to end-user reported incidents and resolution of reported and detected technical issues across an enterprise. In one embodiment, incident reporting module 160 may generate and update maps that visually present frequency and impact of reported and detected technical issues across one or more geographic areas.

Server 170 may store and provide access to diagnostic script 172, corrective script 174, and self-help information 176. Diagnostic script 172 is generally a set of instructions comprising a series of steps which may be used to identify a known technical issue on a computing device. Corrective script 174 is generally a set of instructions comprising a series of steps which may be used to correct a known technical issue on a computing device. For example, such steps may be defined in computer code that may be executed automatically by a computing device. The steps may perform activities such as installing one or more software applications, updating computer system configuration information, etc.

Figure 2:
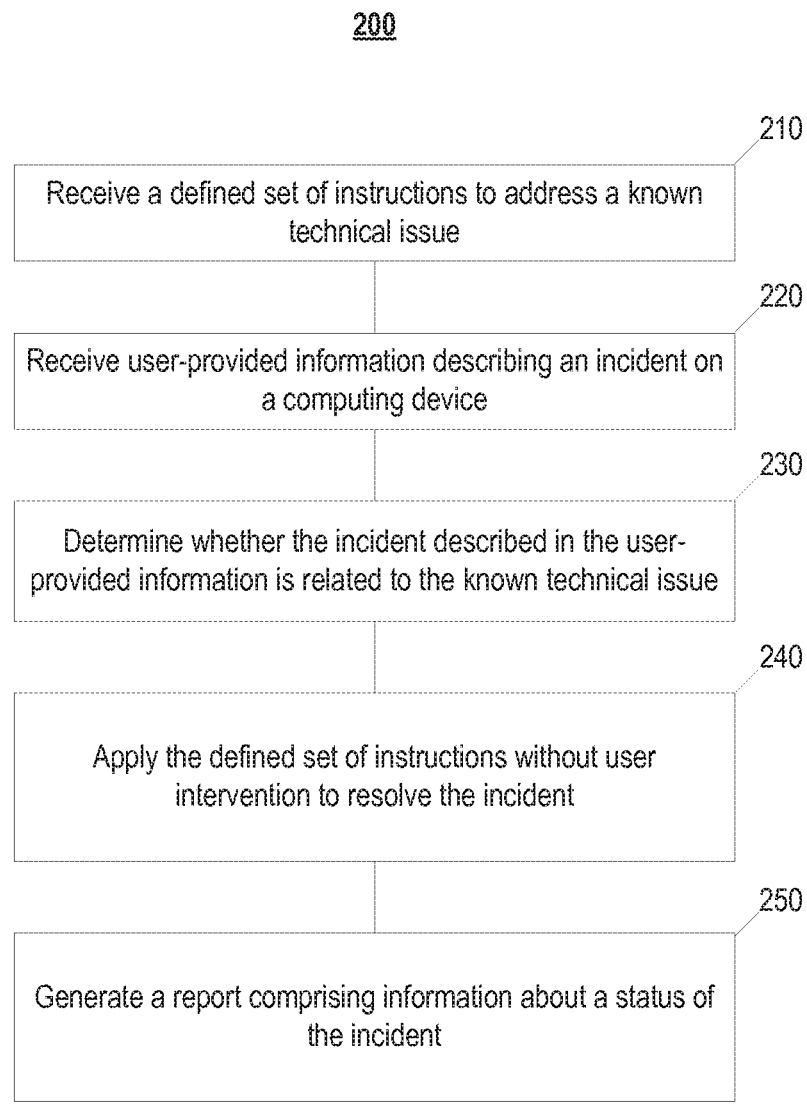
FIG. 2 is a flow diagram illustrating automated incident resolution, according to an embodiment of the present invention.

FIG. 2 is a flow diagram illustrating automated incident incident resolution, according to an embodiment. The method 200 may be performed by processing logic that may comprise hardware (circuitry, dedicated logic, programmable logic, microcode, etc.), software (such as instructions run on a general purpose computer system, dedicated machine, or processing device), firmware, or a combination thereof. In one example, the method 200 is performed using automated incident resolution system 110 of FIG. 1.

At stage 210, one or more defined sets of instructions to address known technical issues are received. According to an embodiment, a set instructions comprising a diagnostic script 172, corrective script 174, and even self-help information 176 may be received. In an example, one or more predefined diagnostic scripts 172, corrective scripts 174 or units of self-help information 176 may be created and associated with one or more different known technical issues. In one embodiment, stage 210 may be performed by incident receiving module 120.

At stage 220, user provided information describing an incident on a computing device is received. In an embodiment, an end-user may report a technical issue that is occurring or exists on a computing device. The end-user may submit an audio or textual description of the incident, which may be in one of a plurality of human languages. Audio submissions may be transcribed to text, and textual descriptions may be processed in an end-user provided human language or electronically translated to a common human language that the system uses for processing. In an example, end-user reported incidents may be a simple description of any problem that the end-user is experiencing when operating the computing device and may include one or more predefined keywords and/or key phrases to aid automatic processing of the reported incident. In one embodiment, stage 220 may performed by incident receiving module 120.

At stage 230, a determination is made whether the incident described in the end-user provided information relates to a known technical issue. In an embodiment, the end-user provided textual description is parsed keywords and phrases from the description matched against a database of known issues. In one example, keywords and phrases from end-user provided text description is matched to knowledge objects (KOs) and key performance indicator (KPI) information to match the incident to one or more known technical issues that may be resolved automatically without end-user intervention. In one embodiment, stage 230 may be performed by incident diagnosis module 130.

At stage 240, a defined set of instructions may be applied without user intervention to address the reported incident. In an embodiment, one or more diagnostic scripts 172, one or more corrective scripts 174, and/or one or more units of self-help information 176 are used to address the known technical issue that matches or is associated with the incident described in the end-user provided information. In one embodiment, stage 240 may be performed by one or more of incident detection module 140 and incident resolution module 150.

At stage 250, a report comprising information about a status of the reported incident is generated. In one embodiment, the report comprises information from the end-user provided description of the incident. The report may also comprise information regarding one or more steps that were used to automatically resolve the incident without end-user intervention. The report may also comprise information describing the status of the incident at one or more different points in time.

In one embodiment, the report is a visual report that presents visual indicators about end-user reported events across an enterprise. In one example, the visual report may comprise map indicators across one or more geographical locations to indicate, for example, frequency, intensity, impact or a combination thereof relating to reported incidents. In one embodiment, stage 250 may be performed by incident reporting module 160.

Figure 3:
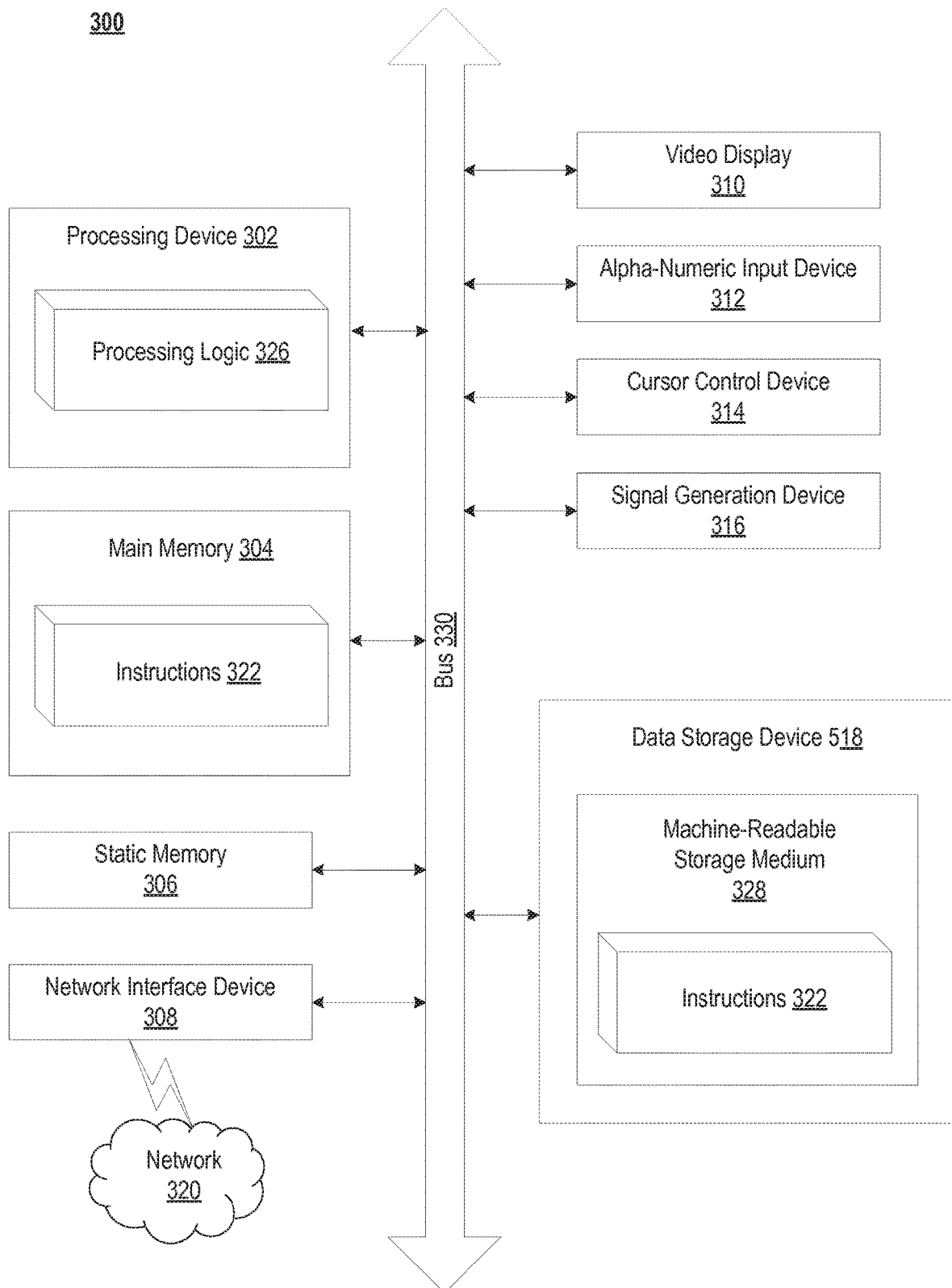
FIG. 3 is a block diagram of an exemplary computer system that may perform one or more of the operations described herein.

FIG. 3 illustrates a diagrammatic representation of a machine in the exemplary form of a computer system 300 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a game console, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 may be comprised of a processing device 302, a main memory 304 (e.g., read-only memory (ROM), flash memory, dynamic random access memory (DRAM) such as synchronous DRAM (SDRAM), double data rate (DDR SDRAM), or DRAM (RDRAM), etc.), a static memory 306 (e.g., flash memory, static random access memory (SRAM), etc.), and a data storage device 318, which communicate with each other via a bus 330.

Processing device 302 represents one or more general-purpose processing devices such as a microprocessor, central processing unit, or the like. More particularly, the processing device may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 302 may also be one or more special-purpose processing devices such as an application specific integrated circuit (ASIC), a field programmable gate array (FPGA), a digital signal processor (DSP), network processor, or the like. Processing device 302 is configured to execute processing logic 326 for performing the operations and steps discussed herein.

Computer system 300 may further include a network interface device 308. Computer system 300 may also include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 316 (e.g., a speaker).

Data storage device 318 may include a machine-readable storage medium (or more specifically a computer-readable storage medium) 328 on which is stored one or more sets of instructions 322 (e.g., software) embodying any one or more of the methodologies or functions described herein. For example, data storage device 318 may store instructions for automated incident resolution. Instructions 322 may also reside, completely or at least partially, within main memory 304 and/or within processing device 302 during execution thereof by computer system 300, main memory 304 and processing device 302 also constituting computer-readable storage media. Instructions 322 may further be transmitted or received over a network 320 via network interface device 308.

Machine-readable storage medium 328 may also be used to store instructions to conduct automated incident resolution. While machine-readable storage medium 328 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method for automated incident resolution of incidents occurring on end-user devices in a computer network, the method comprising:

storing, at a central server, a database of known technical issues, diagnostic scripts for diagnosing incidents, and corrective scripts for resolving the incidents;

receiving, at a computer processor, information including text pertaining to an incident corresponding to one or more technical issues with end-user devices within the computer network;

utilizing the computer processor for performing steps including:

parsing the text to identify keywords and phrases relating to one or more of the known technical issues;

automatically matching the identified keywords and phrases to knowledge objects and key performance indicator information to determine if the one or more technical issues with end-user devices within the computer network are related to one or more known technical issues in a database for which there are one or more related diagnostic scripts;

for each known technical issue determined to be related to the one or more technical issues with end-user devices within the computer network, accessing and running the one or more related diagnostic script comprising a set of instructions embodied in a series of steps and corresponding to the known technical issues to confirm the presence of the known technical issue;

accessing and running a global diagnostic script for diagnosing technical issues unrelated to the identified keywords;

upon confirmation, by diagnostic script, of the presence of a known technical issue, running a corrective script to correct the known and confirmed technical issue, thereby resolving the incident wherein running the corrective script includes updating computing system configuration information; and generating a report of system-wide reported and detected technical issues for the computer network, the report including a map that visually presents frequency and impact of reported and detected technical issues across one or more geographic areas.

2. The method of claim 1, wherein running the corrective script comprises installing one or more software applications.

3. The method of claim 1, wherein the report comprises one or more steps that were utilized to automatically resolve the incidents without user intervention.

4. The method of claim 1, wherein the report comprises information describing the status of each incident at different points in time.

5. The method of claim 1, further comprising accessing and running the at least one diagnostic script and running the corrective script to correct the technical issue, thereby resolving the incident without user intervention.

6. A system for automated incident resolution of incidents occurring on end-user devices in a computer network, the system comprising:
   a central server storing a database of known technical issues, diagnostic scripts for diagnosing incidents, and corrective scripts for resolving the incidents;
   a computer processor receiving information including text pertaining to an incident corresponding to one or more technical issues with the end-user devices within the computer network, the computer processor for performing steps including:
      parsing the text to identify keywords and phrases relating to one or more of the known technical issues;
      automatically matching the identified keywords and phrases to knowledge objects and key performance indicator information to determine if the one or more technical issues with end-user devices within the computer network are related to one or more known technical issues in a database for which there are one or more related diagnostic scripts
      for each known technical issue determined to be related to the one or more technical issues with end-user devices within the computer network, accessing and running the one or more related diagnostic script comprising a set of instructions embodied in a series of steps and corresponding to the known technical issues to confirm the presence of the known technical issue;
      accessing and running a global diagnostic script for diagnosing technical issues unrelated to the identified keywords;
      upon confirmation, by diagnostic script, of the presence of a known technical issue, running a corrective script to correct the known and confirmed technical issue, thereby resolving the incident wherein running the corrective script includes updating computing system configuration information; and
      generating a report of system-wide reported and detected technical issues for the computer network, the report including a map that visually presents frequency and impact of reported and detected technical issues across one or more geographic areas.

7. The system of claim 6, wherein running the corrective script comprises installing one or more software applications.

8. The system of claim 6, wherein the report comprises one or more steps that were utilized to automatically resolve the incidents without user intervention.

9. The system of claim 6, wherein the report comprises information describing the status of each incident at different points in time.

10. The system of claim 6, further comprising accessing and running the at least one diagnostic script and running the correct script to correct the technical issue, thereby resolving the incident without user intervention.

11. A non-transitory computer readable medium, storing instructions thereon, wherein when executed by a processor, perform steps including:
   storing, at a central server, a database of known technical issues, diagnostic scripts for diagnosing incidents, and corrective scripts for resolving the incidents;
   receiving, at a computer processor, information including text pertaining to an incident corresponding to one or more technical issues with end-user devices within the computer network;
   utilizing the computer processor for performing steps including:
      parsing the text to identify keywords and phrases relating to one or more of the known technical issues in a database for which there are one or more related diagnostic scripts;
      automatically matching the identified keywords and phrases to knowledge objects and key performance indicator information to determine if the one or more technical issues with end-user devices within the computer network are related to one or more known technical issues, wherein the at least one diagnostic script comprises a set of instructions embodied in a series of steps which may be automatically executed by the computer processor which confirm the presence of the known technical issue;
      for each known technical issue determined to be related to the one or more technical issues with end-user devices within the computer network, accessing and running the one or more related diagnostic script comprising a set of instructions embodied in a series of steps and corresponding to the known technical issues to confirm the presence of the known technical issue;
      accessing and running a global diagnostic script for diagnosing technical issues unrelated to the identified keywords;
      upon confirmation, by diagnostic script, of the presence of a known technical issue, running a corrective script to correct the known and confirmed technical issue, thereby resolving the incident wherein running the corrective script includes updating computing system configuration information; and
      generating a report of system-wide reported and detected technical issues for the computer network, the report including a map that visually presents frequency and impact of reported and detected technical issues across one or more geographic areas.

* * * * *